US006872038B2

(12) United States Patent
Westlake

(10) Patent No.: US 6,872,038 B2
(45) Date of Patent: Mar. 29, 2005

(54) SPRING NUT ADAPTER

(76) Inventor: Patrick C. Westlake, 465 Twp. Rd. 471, Hammondsville, OH (US) 43930

( * ) Notice: Subject to any disclaimer, the term of this patent is extended or adjusted under 35 U.S.C. 154(b) by 0 days.

(21) Appl. No.: 10/238,311

(22) Filed: Sep. 10, 2002

(65) Prior Publication Data

US 2003/0049094 A1 Mar. 13, 2003

Related U.S. Application Data

(60) Provisional application No. 60/318,756, filed on Sep. 10, 2001.

(51) Int. Cl.[7] ............................................. F16B 27/00
(52) U.S. Cl. ................................... 411/85; 411/104
(58) Field of Search ........................... 411/84, 85, 104

(56) References Cited

U.S. PATENT DOCUMENTS

| 2,531,348 A | 11/1950 | Amesbury |
| 2,737,268 A | 3/1956 | Smith |
| 4,545,697 A | 10/1985 | Verdenne et al. |
| 4,575,295 A | 3/1986 | Rebentisch |
| 4,917,553 A | 4/1990 | Muller |
| 5,118,233 A | 6/1992 | Mitchell |
| 5,271,586 A | * 12/1993 | Schmidt ...................... 248/58 |
| 5,370,488 A | * 12/1994 | Sykes ......................... 411/551 |
| 5,375,798 A | * 12/1994 | Hungerford, Jr. ............ 248/58 |
| 5,411,356 A | * 5/1995 | Travis et al. .................. 411/85 |
| 5,489,173 A | * 2/1996 | Hofle .......................... 411/85 |
| 5,503,511 A | 4/1996 | Flamme |
| 5,624,217 A | * 4/1997 | Hungerford, Jr. ............. 411/85 |
| 5,820,322 A | * 10/1998 | Hermann et al. ............. 411/85 |
| 5,975,822 A | * 11/1999 | Ruff .......................... 411/553 |
| 6,386,809 B2 | * 5/2002 | Ikuta ......................... 411/340 |
| 6,582,170 B2 | * 6/2003 | Dinh et al. ................... 411/85 |

* cited by examiner

*Primary Examiner*—Gary S. Hartmann
(74) *Attorney, Agent, or Firm*—Webb Ziesenheim Logsdon Orkin & Hanson, P.C.

(57) ABSTRACT

A spring nut adapter for use in connection with a U-shaped channel. The channel has a base plate, two side plates and channel grooves on upper portions of the side plates. The channel grooves are bounded by channel groove walls. The spring nut adapter includes a face plate with an attachment orifice extending therethrough, and a compression spring with a first end and a second end. The first end of the compression spring is secured to an underside of the face plate; an adapter element is secured to the second end of the compression spring.

18 Claims, 2 Drawing Sheets

US 6,872,038 B2

SPRING NUT ADAPTER

CROSS REFERENCE TO RELATED APPLICATIONS

This application takes priority from U.S. Provisional Application Ser. No. 60/318,756, filed Sep. 10, 2001.

BACKGROUND OF THE INVENTION

1. Field of the Invention

The present invention relates generally to spring nuts, and, in particular, to spring nuts used in connection with channels and frames.

2. Description of the Prior Art

In virtually all construction trades and maintenance installations, U-shaped channels and frames are used for constructing support structures or providing conduits for electrical/cable wiring. For example, see U.S. Pat. No. 5,118,233 to Mitchell. In order to fasten face plates or other objects to the U-shaped channels, a spring nut is used by sliding the spring nut into the channel.

Specifically, the spring nut uses a face plate having a screw orifice to provide a means for attaching other objects to the channel. In order to urge the face plate of the spring nut towards ends of side plates of the frame, a compression spring is used. The user may simply slide the face plate/compression spring structure along the channel. However, if a base portion or plate of the channel has irregularities or orifices, the end of the compression spring catches and bends, thereby preventing lateral movement along the channel. This, in turn, increases the difficulty involved with installation and maintenance of construction utilizing the U-shaped channels.

SUMMARY OF THE INVENTION

It is, therefore, an object of the present invention to provide a spring nut adapter that overcomes the deficiencies of the prior art. It is another object of the present invention to provide a spring nut adapter that is attachable to the free end of a compression spring on a spring nut, which would allow the spring nut to freely slide along a channel. It is another object of the present invention to provide a spring nut adapter that is inexpensive to manufacture and easy to install. It is still a further object of the present invention to provide a spring nut adapter that is simple in its installation and maintenance in the field.

The present invention is a spring nut adapter for use in connection with a substantially U-shaped channel, the channel having a base plate and two side plates and channel grooves on upper portions of the side plates. The spring nut adapter includes a face plate having an attachment orifice extending therethrough. The spring nut adapter further includes a compression spring having a first and second end, with the first end of the compression spring secured to an underside of the face plate and extending away from the face plate. An adapter element is secured to the second end of the compression spring. The adapter element is sized and shaped such that, when the combined face plate/compression spring/adapter element is slid laterally along the grooves of the channel, the second end of the spring slides with the adapter element, thereby preventing the second end of the spring to catch on the base plate of the channel.

The present invention, both as to its construction and its method of operation, together with additional objects and advantages thereof, will best be understood from the following description of specific embodiments when read in connection with the accompanying drawings.

DETAILED DESCRIPTION OF THE PREFERRED EMBODIMENTS

Figure 1:
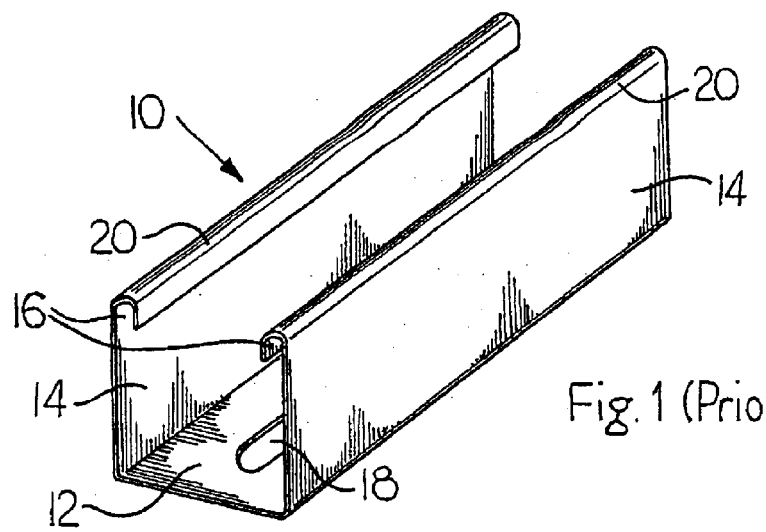
FIG. 1 is a perspective view of a U-shaped channel according to the prior art.

Various numerical ranges are disclosed in this patent application. Because these ranges are continuous, they include every value between the minimum and maximum values. Unless expressly indicated otherwise, the various numerical ranges specified in this application are approximations.

For purposes of the description hereinafter, the terms "upper", "lower", "right", "left", "vertical", "horizontal", "top", "bottom" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Figure 2:
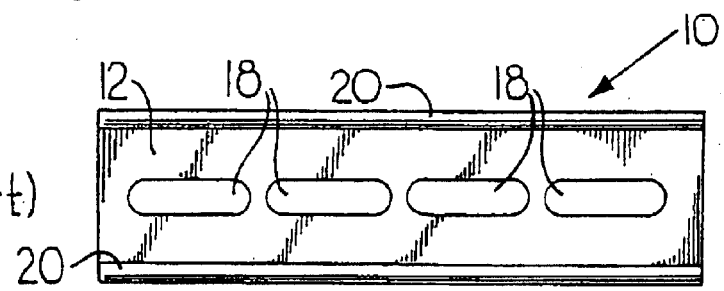
FIG. 2 is a top view of the U-shaped channel of FIG. 1.

A U-shaped channel 10 according to the prior art is illustrated in FIGS. 1 and 2. The channel 10 has a base plate 12 and two side plates 14 extending at substantially right angles with respect to base plate 12. On upper portions of each side plate 14 are channel grooves 16, which act as guides laterally along the channel 10. Though not necessary, some channels 10 have at least one channel orifice 18 spaced along and extending through the base plate 12 of the channel 10. Further, the channel grooves 16 are bounded by a channel groove wall 20, which is an inverted substantially U-shaped element. Channel 10 is a common element used in many industries and is typically referred to as a "unistrut".

Figure 3:
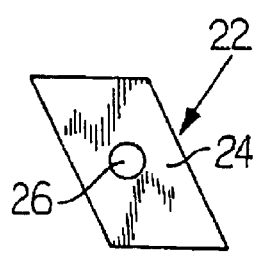
FIG. 3 is a top view of a spring nut according to the prior art.
Figure 4:
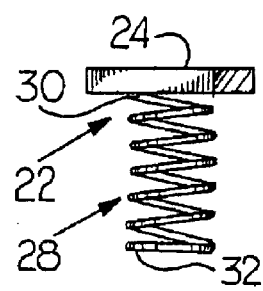
FIG. 4 is an edge view of the spring nut of FIG. 3.
Figure 5:
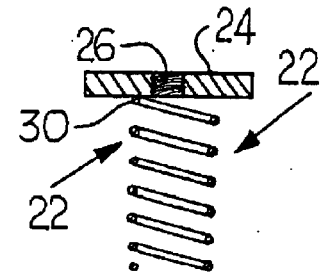
FIG. 5 is an edge sectional view of the spring nut of FIG. 3.

As seen in FIGS. 3–5, in order to attach an object to an open end of the channel 10, a spring nut 22 is used. The spring nut 22 includes a face plate 24 having an attachment orifice 26 extending through the face plate 24. Typically, the shape of the face plate 24, when viewed from above, is that of a parallelogram, for reasons that will be explained hereinafter. Turning to FIG. 4, the spring nut 22 also includes a compression spring 28 having a compression spring first end 30 and a compression spring second end 32. The compression spring first end 30 is attached to an underside of the face plate 24. The compression spring second end 32 extends away from the underside of the face plate 24 and remains free of any further attachment. Typically, since the inside diameter of the coils of the compression spring 28 are ½ inch, this is the maximum width of the attachment orifice 26. Further, the attachment orifice 26 diameter is typically in the range of 9/32 inch to ½ inch.

Figure 6:
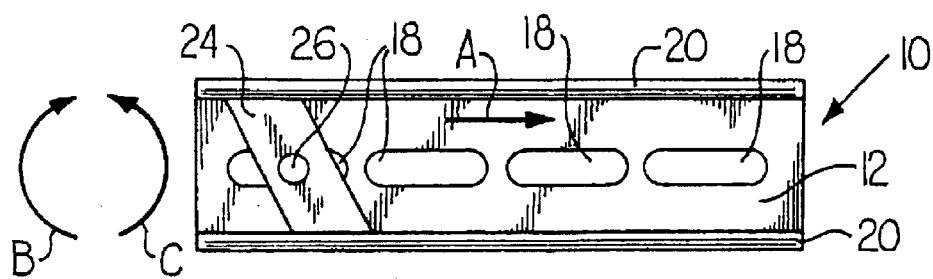
FIG. 6 is a top view of the spring nut of FIG. 3 as engaged with the U-shaped channel of FIG. 1.

In operation, the spring nut 22 is slid laterally into the channel 10 by compressing the compression spring 28 appropriately. Once engaged, the compression spring second end 32 rides along the base plate 12 and urges the face plate 24 against the channel groove wall 20. As seen in FIG. 6, the spring nut 22 is slid along the channel 10 in the direction of arrow A. Once the spring nut 22 is in an appropriate position, the user places an object (not shown) to be attached over the channel 10, aligning any screw or attachment orifice in the object with the screw orifice 26 of the face plate 24 and fixing the object to the face plate 24 with a screw (not shown) turned in the direction of arrow B.

Due to the parallelogram shape of the face plate 24, ends of the face plate 24 abut the side plates 14 of the channel 10, thereby allowing the screw to be tightened. Similarly, if the user would like to remove the object from the channel 10, the screw is turned in the direction of arrow C, and again due to the shape of the face plate 24, the spring nut 22 is rotated and eventually abuts the side plates 14 allowing the screw to be removed.

Figure 7:
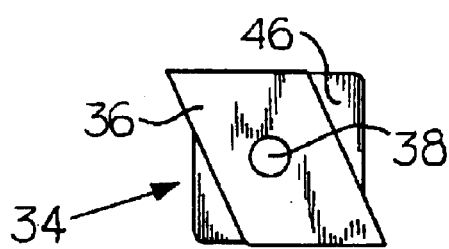
FIG. 7 is a top view of a first embodiment of a spring nut adapter according to the present invention.
Figure 8:
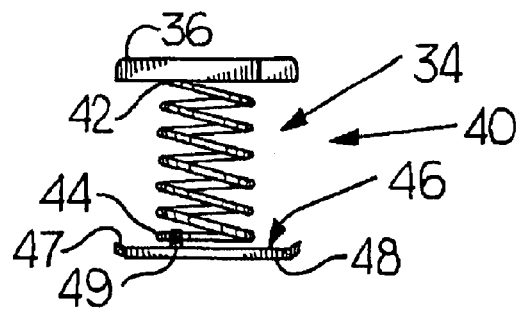
FIG. 8 is an edge view of the spring nut adapter of FIG. 7.

Turning to the present invention, a first embodiment of a spring nut adapter 34 according to the present invention is illustrated in FIGS. 7 and 8. The spring nut adapter 34, as with the prior art, includes a face plate 36 having an attachment orifice 38 extending through the face plate 36. Further, a compression spring 40 is attached to an underside of the face plate 36, and the compression spring 40 has a compression spring first end 42 and a compression spring second end 44. The compression spring first end 42 is secured to the underside of the face plate 36. The compression spring second end 44 is secured to an adapter element 46.

In the present embodiment, the adapter element 46 is a substantially square-shaped element with a dimension less than the width of the base plate 12 of the channel 10. However, the adapter element 46 can be square-shaped, rectangular, circular, etc. In addition, in order to allow easier lateral movement, the corners of the adapter element 46 may be beveled or rounded.

Still further, the adapter element 46 includes an adapter element upper surface 47 and an adapter element lower surface 48. The adapter element upper surface 47 and the adapter element lower surface 48 are generally planar surfaces. In a preferred embodiment, at least one, and typically all, of the adapter element corners extend in a direction partially divergent from the adapter element upper surface 47 and/or the adapter element lower surface 48. For example, the corners can be rounded or beveled in a raised manner. As with the beveled or rounded corners, this raised corner arrangement also allows for easier lateral movement of the adapter element 46.

In order to attach the compression spring second end 44 to the adapter element 46, the adapter element 46 may also include an attachment loop 49 on the adapter element upper surface 47. In manufacture, the compression spring second end 44 is fed into and/or through the attachment loop 49 and the attachment loop 49 is compressed, thereby securing the compression spring second end 44 to the adapter element 46.

Figure 9:
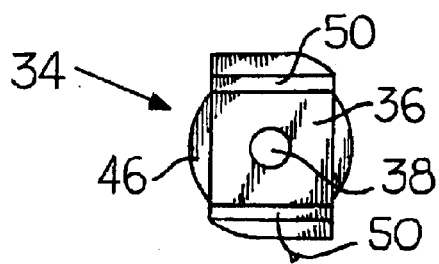
FIG. 9 is a top view of a second embodiment of a spring nut adapter according to the present invention.
Figure 10:
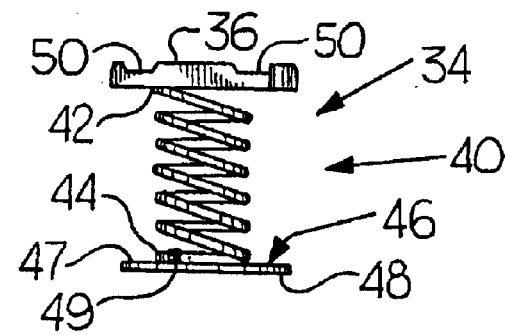
FIG. 10 is an edge view of the spring nut adapter of FIG. 9.

A second embodiment of a spring nut adapter 34 according to the present invention is illustrated in FIGS. 9 and 10. In this embodiment, the face plate 36 includes face plate grooves 50 which are adapted to allow the end of the channel groove wall 20 to be at least partially inserted into the face plate groove 50. When the spring nut adapter 34 is engaged with the channel 10, the face plate grooves 50 allow the spring nut adapter 34 to be more easily slid laterally along the channel 10. In this embodiment, the adapter element 46 is substantially circular in shape, which also allows for easier lateral movement. In addition, the face plate 36 has at least two beveled or rounded corners, which allow for partial rotation of the face plate 36. Further, the face plate 36 typically is in the shape of a parallelogram.

Figure 11:
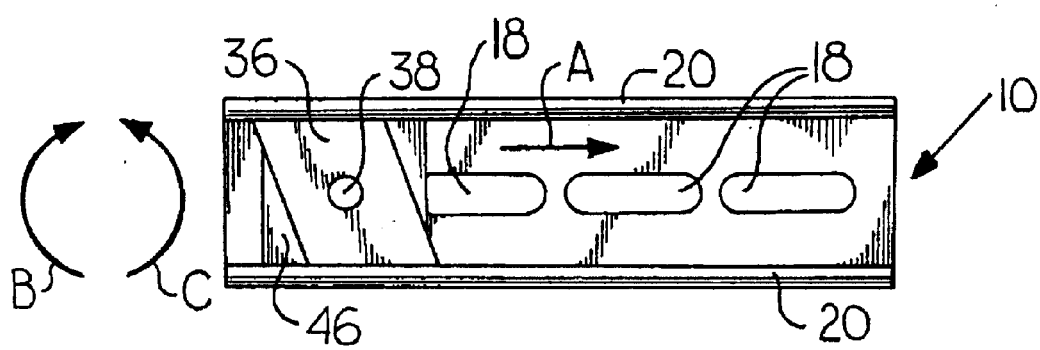
FIG. 11 is the spring nut adapter of FIG. 7 as engaged with the U-shaped channel of FIG. 1.

FIG. 11 shows the spring nut adapter 34 engaged with the channel 10. As discussed above, the compression spring 40 is slightly compressed, and the spring nut adapter 34 is fed into one end of the channel 10. Once inserted, the spring nut adapter is allowed to expand, such that the face plate 36 abuts the channel groove walls 20 and the adapter element 46 abuts the base plate 12 of the channel 10.

When the spring nut adapter 34 is slid in the direction of arrow A, and since the compression spring second end 44, as opposed to riding free, is attached to the adapter element 46, the compression spring second end 44 cannot catch on the channel orifices 18 or any other irregularity along the base plate 12 of channel 10. In addition, when an object is to be attached to channel 10, the spring nut adapter 34, due to the adapter element 46, is more easily movable in the direction of arrow A. Once the desired position is obtained, and the user places an object and aligns any screw or attachment orifice of the object with the attachment orifice 38 of the face plate 36, a screw (not shown) is inserted through the aligned orifices. When the user rotates the screw in the direction of arrow B, the object is tightened against the channel groove wall 20 of the channel 10, which is tightened against the face plate 36 of the spring nut adapter 34. Also, when a screw is turned in the direction of arrow C, the screw is untightened, and the object that was previously attached to the channel 10 is removed.

Figure 12:
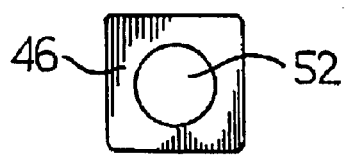
FIG. 12 is a top view of an adapter element according to the present invention.

It is also envisioned, as seen in FIG. 12, that the adapter element 46 may include an adapter element orifice 52. This adapter element orifice 52 would allow a user to insert a screw or other attachment mechanism through the attachment orifice 38 of the face plate 36, further through the center of the coils of the compression spring 40, through the adapter element orifice 52 and finally through the channel orifice 18 of the base plate 12. In addition, the adapter element orifice 52 is sized typically equal to or less than the inside diameter of the coils of the compression spring 40. Similarly, the attachment orifice 38 is sized typically equal to or less than the inside diameter of the coils of the compression spring 40. The inside diameter of the coils of the compression spring 40 are in the range of about ¼ inch to about ¾ inch and typically are ½ inch. Also the inside diameter of the attachment orifice is in the range of about 9/32 of an inch to about ¾ of an inch and typically in the range of 9/32 of an inch to ½ inch. The spring nut adapter 34 is typically manufactured from carbon steel or stainless steel. However, the spring nut adapter 34 can be manufactured from any metal, semi-metal, alloy, plastic, polymer and/or synthetic material.

In this manner, a spring nut adapter 34 is provided which allows lateral movement along a channel 10 without catching the compression spring second end 44 on channel orifices 18 or other irregularity along the base plate 12 of the channel 10. Further, the present invention is inexpensive to manufacture and easy to use. Also, the adapter element 46 of the spring nut adapter 34 provides easier installation and maintenance in the field.

This invention has been described with reference to the preferred embodiments. Obvious modifications and alterations will occur to others upon reading and understanding the preceding detailed description. It is intended that the invention be construed as including all such modifications and alterations.

What is claimed:

1. A spring nut adapter for use in connection with a substantially U-shaped channel having a base plate with at least one channel orifice extending therethrough, two side plates and channel grooves on upper portions of the side plates, the channel grooves being bounded by channel groove walls, the spring nut adapter comprising:

a face plate having an attachment orifice extending therethrough;

a compression spring having a first end and a second end, the first end of the compression spring secured to an underside of the face plate and extending away from the face plate; and an adapter element having an adapter element orifice and secured to the second end of the compression spring and urged away from the face plate thereby;

wherein the spring nut adapter is configured to be positioned within the U-shaped channel;

wherein the adapter element is sized and shaped such that, when the spring nut adapter is slid along the channel grooves and laterally along the channel, the second end of the compression spring slides with the adapter element and the adapter element contacts the base plate of the channel, thereby preventing the second end of the compression spring from catching on the base plate of the channel.

2. The spring nut adapter of claim 1, wherein the adapter element is one of substantially square-shaped, rectangular and circular.

3. The spring nut adapter of claim 1, wherein the adapter element comprises at least one adapter element corner and at least one of the adapter element corners are one of beveled and rounded.

4. The spring nut adapter of claim 1, wherein the adapter element includes an adapter element upper surface and an adapter element lower surface and at least one of the adapter element upper surface and the adapter element lower surface is substantially planar.

5. The spring nut adapter of claim 4, wherein at least one adapter element corner extends in a direction at least partially divergent from one of the adapter element upper surface and the adapter element lower surface.

6. The spring nut adapter of claim 1, wherein the face plate is in the shape of a parallelogram.

7. The spring nut adapter of claim 6, wherein the face plate further comprises at least one face plate corner and at least one of the face plate corners is one of beveled and rounded.

8. The spring nut adapter of claim 1, wherein the face plate includes a face plate upper surface having at least one face plate groove, the face plate groove configured to receive an end of the channel groove wall.

9. The spring nut adapter of claim 1, further comprising an attachment loop attached to an adapter element upper surface, through which the second end of the compression spring is inserted and wherein the attachment loop is compressed, thereby securing the second end of the compression spring to the adapter element.

10. The spring nut adapter of claim 1, wherein the inside diameter of coils of the compression spring are greater than the diameter of the attachment orifice.

11. The spring nut adapter of claim 1, wherein the inside diameter of coils of the compression spring are greater than the inside diameter of the adapter element orifice.

12. The spring nut adapter of claim 1, wherein the inside diameter of coils of the compression spring are in the range of about ¼ inch to about ¾ inch.

13. The spring nut adapter of claim 1, wherein the inside diameter of the attachment orifice is in the range of about 5/32 inch to about ¾ inch.

14. The spring nut adapter of claim 1, wherein the attachment orifice is threaded and adapted to mate with threads on an appropriately sized screw.

15. The spring nut adapter of claim 1, wherein the spring nut adapter is manufactured from one of carbon steel, stainless steel, a metal, a semi-metal, an alloy, a plastic, a polymer and a synthetic material.

16. A kit for attaching an object having an attachment orifice to a structure, comprising:

a substantially U-shaped channel attached to a structure and having a base plate with at least one channel orifice extending therethrough, two side plates and channel grooves on upper portions of the side plates, the channel grooves being bounded by channel groove walls;

a spring nut adapter having a face plate having an attachment orifice extending therethrough, a compression spring having a first end and a second end, the first end of the compression spring secured to an underside of the face plate and extending away from the face plate, and an adapter element having an adapter element orifice and secured to the second end of the compression spring and urged away from the face plate thereby; and an attachment mechanism configured to extend through the adapter element orifice and mate with the object attachment orifice and the face plate attachment orifice, thereby attaching the object to the channel groove walls;

wherein the spring nut adapter is configured to be positioned within the U-shaped channel;

wherein the adapter element is sized and shaped such that, when the spring nut adapter is slid along the channel grooves and laterally along the channel, the second end of the compression spring slides with the adapter element and the adapter element contacts the base plate of the channel, thereby preventing the second end of the compression spring from catching on the base plate of the channel.

17. The kit of claim 16, wherein the attachment mechanism is configured to further extend through the adapter element orifice.

18. The kit of claim 16, wherein at least one of the object attachment orifice and the face plate attachment orifice is threaded and adapted to mate with threads on the attachment mechanism.

* * * * *